United States Patent Office 3,365,247
Patented Jan. 23, 1968

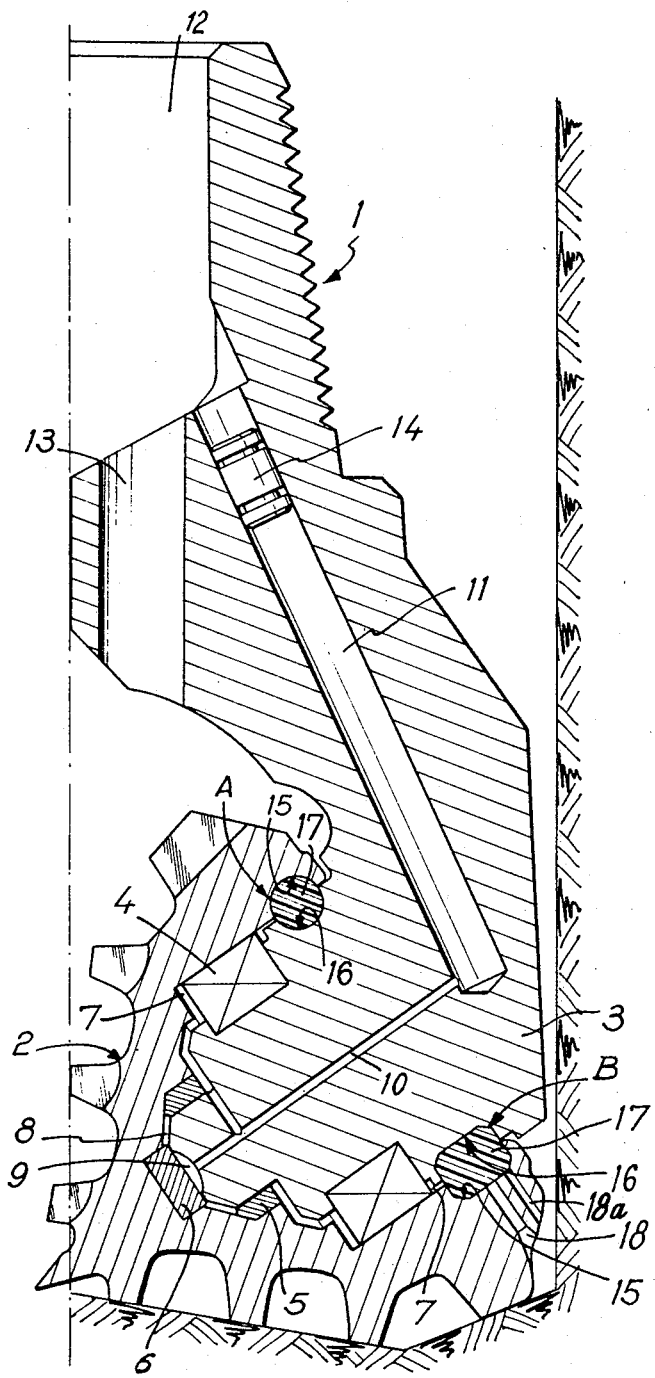

3,365,247
ROLLER BITS FOR BOREHOLE DRILLING
Jean Georges Ferrand, Billiere, France, assignor to Societe Nationale des Petroles d'Aquitaine, Billiere, France
Filed June 4, 1965, Ser. No. 461,308
Claims priority, application France, June 24, 1964, 979,437
9 Claims. (Cl. 308—8.2)

ABSTRACT OF THE DISCLOSURE

A roller bit having a plurality of rollers rotating on thrust bearings and in which circular grooves are formed in each roller near the base thereof and in each adjacent mounting arm to form an annular passage therebetween. A sealing and securing ring gasket, allowing rotational but preventing axial movement of each roller, is placed in each annular passage and is connected to lubrication chamber provided for the thrust bearings but prevents leakage of lubrication from the chambers.

This invention is for improvements in or relating to roller bits for borehole drilling.

The known roller bits comprise, for each roller having cutting edges, a support or mounting arm, a main thrust bearing, a front thrust bearing and, where applicable, an auxiliary thrust bearing disposed between the roller inner wall and the said arm, a ball bearing being disposed near the base of the conical roller and being adapted to secure the same to the arm.

The working life of a roller bit, for instance, of the kind comprising three rollers, is limited mainly not by wear of the roller cutting edges but by premature wear of the thrust bearings, which have to withstand radial and axial loads and therefore by premature wear of the fixing balls. This means that the life of a three-roller bit is some 3 to 6 hours in sand and, depending upon circumstances, from 10 to 20 hours in other kinds of ground. Clearly, the frequent replacement of roller bits because of premature wear is a very costly business, the cost increasing in proportion as the borehole is deeper. The job of completely changing the bit varies, for instance, from 8 to 16 hours for boreholes of from 2000 to 3000 metres deep, and any improvement which helps to increase bit life and therefore actual drilling time is therefore advantageous.

The short working life of roller bits has two main causes. First, mud and spoil enter the ball bearings and thrust bearings and cause wear by abrasion. Second, wear of the thrust bearings leads to the fixing balls experiencing shear stress and to heavy loading at the places of point contact between the balls and their raceways. The same rapidly flake away and become damaged and make the bit unserviceable.

This invention obviates all the disadvantages mentioned, and one of its objects is to provide a roller bit whose thrust bearings are sealed right off from drilling mud, the sealing effect being provided by the means for securing the bit to the support arm, such means having contact and shear surfaces greater than are provided by the known fixing balls. To this end, according to the invention, a roller bit wherein each roller is mounted on a bit support or mounting arm through the agency of at least one radial thrust bearing and of one front bearing and wherein each roller and each support arm are formed near the base of the conical roller with circular grooves symmetrical of one another, so that an annular channel is formed by the two grooves in a plane perpendicular to the roller axis, has sealing and securing ring gaskets each received in the corresponding channel formed by the groove in the roller and by the groove in the support arm, the latter means preventing any axial movement of the roller, the annular channel or passage being connected to the thrust bearing lubrication chamber, in which the lubricant is always at a pressure above the pressure of the drilling mud around the rollers.

According to another feature of the invention, the annular channel formed by the two grooves is connected to the outside through a filling passage in juxtaposed relationship with a venting passage, both such passages being closable and being formed in the roller or in the support arm, the filling passage being adapted for the introduction of the gasket or packing into the annular passage, the venting passage serving for the removal of air or any other substance in the annular passage before introduction of the gasket. According to another feature of the invention, the ring gasket is in cross-section circular or polygonal. According to another feature of the invention, the axial width of the ring gasket is greater than the radial height of its cross-section. According to another feature of the invention, the ring gasket is made of a polyamide. According to another feature of the invention, the ring gasket is made of a polyamide loaded with molybdenum disulphide making up from 20 to 30% of the total weight of the gasket. According to another feature of the invention, the ring gasket is made of "Nylon 6" obtained by polymerisation in situ after introduction of its ingredients and of the catalyst into the annular passage via the closable passage.

According to another feature of the invention, the bit comprises for each roller a cylindrical passage connected to the central passage of the bit upstream of the corresponding jet nozzle, the cylindrical passage being connected at its other end via a passage to the thrust bearing lubrication chamber, and the bit also comprises a piston in sliding type relationship with the cylindrical passage, the same being filled with a lubricant downstream of the piston.

The invention will be more readily understood from the following description of two purely exemplary embodiments, reference being made to the single figure which forms the accompanying drawing and which is a view in axial section of a three-roller bit, the section being through the central vertical plane of the rollers.

A roller bit 1 comprises for each of a number of conical rollers 2 a support or mounting arm 3 which engages with the respective roller 2 with radial and axial clearance. Disposed between the roller 2 and the arm 3 are a main thrust bearing 4 and an auxiliary thrust bearing 5 both adapted to withstand axial loading of the roller 2. A front thrust bearing 6 is also disposed between the roller 2 and the arm 3 to withstand axial loading of the roller 2. At the place where the bearings 4–6 are disposed, the roller 2 and arm 3 co-operate to bound lubricating chambers 7–9 communicating via a central duct 10 with a cylindrical passage 11 which joins a central passage 12 of the bit 1 upstream of a corresponding jet nozzle 13. A piston 14 is disposed in the passage 11 and provides a hermetic separation between, on the one hand, the lubricant in the passage 11 and chambers 7–9 and, on the other hand, the drilling mud passing through the central passage 12 and nozzle 13. The piston 14 also transmits to the lubricant the mud pressure, which is the pressure upstream of the nozzle 13 and is above the pressure at the base of the rollers 2, since the mud passing through the nozzles 13 experiences a load loss.

The inner wall of the roller 2 is formed near its base with a circular groove 15, and the arm 3 is formed opposite the groove 15 with a circular groove 16, the two grooves 15, 16 being symmetrical of one another and cooperating to form an annular duct communicating with the lubricating chamber 7. The latter annular duct receives a sealing and securing ring gasket 17 which keeps the mud away from the bearings 4, 5 and helps to secure the roller 2 to the arm 3 in such manner as to prevent any axial movement of the roller 2. The gasket or packing 17 does not of course impede the rotation of the roller 2. The gasket 17 can in cross-section be circular, as denoted by the reference A, or octagonal, as denoted by the reference B, or have any other appropriate polygonal cross-sectional shape.

The gasket or packing 17 is made of a polyamide, preferably "Nylon 6," but can be made of a molybdenum-disulphide-loaded polyamide, the molybdenum sulphide weight being from 20 to 30% of the total weight of the packing 17, in which event the coefficient of friction of the packing is improved. The packing can of course be made of any other anti-friction material and can, for instance, be cast in situ or introduced solid into the annular duct formed by the grooves 15, 16.

Preferably, the roller 2 is formed opposite the groove 15 with a filling channel 18 which extends to the exterior and through which the ingredients of the gasket 17 can be introduced in the liquid state; at a temperature of about 150° C. the ingredients polymerise in situ, for instance, in 10 minutes. The filling passage 18 is then closed. An air vent channel 18a is provided, for instance, beside the filling passage 18 for venting the air in the annular passage 15, 16 when the gasket 17 is positioned. The venting passage is also closed after the packing 17 has been positioned.

The filling passage 18 can of course have the same dimensions as the annular passage formed by the grooves 15, 16 so that the packing 17 can be introduced finished. The passage 18 can be formed in the arm 3 instead of in the roller 2.

The substance used for the packing 18 is chosen to have the physical properties which will enable the packing to withstand the maximum forces experienced by the bit. Such substance must also have good ability to withstand abrasion, impacts, contact with acids, drilling mud and so on and must have a low coefficient of friction. It has been found in experiments that polyamides, particularly "Nylon 6" loaded with molybdenum disulphide, are completely satisfactory.

The increase in the contact area between, on the one hand, the gasket 17 and the roller 2 and, on the other hand, the arm 3 considerably reduces the pressure experienced by the packing 17 as compared with the conventional securing balls. Similarly, the annular cross-section of the gasket 17 in shear after complete wear of the front thrust bearings is much greater than is available with securing balls, and so for equal forces transmitted to the bit, the life thereof is much longer than the life of a conventional bit.

As already stated, the cylindrical passage 11 and the lubricating chambers 7, 8 are filled with oil or graphited grease or the like and are closed by the piston 14. The pressure of the mud in the central passage 12, such pressure always being greater than the pressure of the mud around the roller 2, is transmitted to the lubricant via the piston 14 so as to urge the packing 17 against the walls of the grooves 15, 16, so that the bearings 4, 5, 6 are well protected from the harmful effects of the debris loaded mud but stay in a lubricating medium.

The loading on the packing 17 can be controlled either by modification of the load loss of the mud in the bit or by variation of the cross-section of the piston 14 or by variation of that area of the gasket 17 which is in contact with the walls of the annular grooves 15, 16.

Of course, this invention is not limited to a three-cone bit. Also, the invention can be varied in many ways without any departure from the scope of the invention.

I claim:

1. Roller bit for borehole drilling, comprising: a plurality of mounting arms; a conical roller having cutting edges mounted on each of said arms; a main thrust bearing, a front thrust bearing and an auxiliary thrust bearing disposed between each roller inner wall and the corresponding mounting arm; each mounting arm and its conical roller being formed near the base thereof with opposed, annular grooves which together form an annular passage; a sealing and securing ring gasket disposed in each annular passage permitting rotation but preventing axial movement of the roller on its arm; the inner wall of each roller and the outer wall of its arm, interior of said sealing and securing ring gasket, forming a lubrication chamber for the said bearings and for the sealing and securing ring gasket; and means for maintaining the lubricant in the chambers under pressure at least equal to and preferably greater than that of surrounding drilling mud during operation of the bit.

2. Roller bit as set forth in claim 1, wherein the annular passage formed by the grooves in the roller and in the arm is connected to the outside through a filling passage in juxtaposed relationship with a venting passage, both such passages being closable and the filling passage being adapted for the introduction of the gasket into the annular passage, the venting passage serving to clear the annular passage before introduction of the gasket.

3. Roller bit as set forth in claim 1, wherein each of the annular passages and each of the ring gaskets are of circular cross-section.

4. Roller bit as set forth in claim 1, wherein each of the annular passages and each of the ring gaskets are of polygonal cross-section.

5. Roller bit as set forth in claim 1, wherein the axial width of each of the annular passages and each of the ring gaskets is greater than the radial height of their cross-section.

6. Roller bit as set forth in claim 1, wherein each of the ring gaskets is made of a polyamide.

7. Roller bit as set forth in claim 1, wherein each of the ring gaskets is made of a polyamide loaded with molybdenum disulphide making up from 20 to 30% of the total weight of the gasket.

8. Roller bit as set forth in claim 1, wherein the annular passage formed by the grooves in the roller and in the arm is connected to the outside through a filling passage in juxtaposed relationship with a venting passage, both such passages being closable and the filling passage being adapted for the introduction of the gasket into the annular passage, the venting passage serving to clear the annular passage before introduction of the gasket, and wherein the ring gasket is made of "Nylon 6" obtained by polymerisation in situ after introduction of its ingredients and of the catalyst into the annular passage via the closable filling passage.

9. Roller bit as set forth in claim 1, wherein said means for maintaining the lubricant under pressure in the bit comprises for each roller a cylindrical passage connected to the central passage of the bit upstream of the corresponding jet nozzle, the cylindrical passage being connected at its other end via a passage to the thrust bearing lubrication chamber, and the bit also comprises a piston in sliding type relationship with the cylindrical passage, the same being filled with a lubricant downstream of the piston, the upstream side of said piston being in communication with said central passage.

References Cited

UNITED STATES PATENTS

| | | | |
|---|---|---|---|
| 2,814,465 | 11/1957 | Green | 308—8.2 |
| 3,096,835 | 7/1963 | Neilson | 308—8.2 |
| 3,113,630 | 12/1963 | Williams | 175—371 |
| 3,127,942 | 4/1964 | Neilson | 308—8.2 |
| 3,244,459 | 4/1966 | Ortloff | 308—8.2 |

MARTIN P. SCHWADRON, *Primary Examiner.*

PAUL E. MASLOUSKY, *Examiner.*